US012107322B2

(12) United States Patent
Shu et al.

(10) Patent No.: US 12,107,322 B2
(45) Date of Patent: Oct. 1, 2024

(54) ANTENNA SYSTEM AND TERMINAL DEVICE

(71) Applicant: XI'AN ZHONGXING NEW SOFTWARE CO., LTD., Xi'An (CN)

(72) Inventors: Chaofan Shu, Shenzhen (CN); Yang Liu, Shenzhen (CN); Chuangzhu Zhou, Shenzhen (CN)

(73) Assignee: XI'AN ZHONGXING NEW SOFTWARE CO., LTD., Xi'An (CN)

( * ) Notice: Subject to any disclaimer, the term of this patent is extended or adjusted under 35 U.S.C. 154(b) by 346 days.

(21) Appl. No.: 17/612,119

(22) PCT Filed: Mar. 18, 2020

(86) PCT No.: PCT/CN2020/080078

§ 371 (c)(1),
(2) Date: Nov. 17, 2021

(87) PCT Pub. No.: WO2020/233211

PCT Pub. Date: Nov. 26, 2020

(65) Prior Publication Data

US 2022/0238984 A1 Jul. 28, 2022

(30) Foreign Application Priority Data

May 20, 2019 (CN) ......................... 201910419841.9

(51) Int. Cl.
*H01Q 1/24* (2006.01)
*H01Q 1/38* (2006.01)
(Continued)

(52) U.S. Cl.
CPC ............... *H01Q 1/243* (2013.01); *H01Q 1/38* (2013.01); *H01Q 1/521* (2013.01); *H01Q 5/50* (2015.01); *H01Q 13/085* (2013.01)

(58) Field of Classification Search
CPC .......... H01Q 1/243; H01Q 1/38; H01Q 1/521; H01Q 1/36; H01Q 1/48; H01Q 1/50;
(Continued)

(56) References Cited

U.S. PATENT DOCUMENTS 6,624,790 B1 9/2003 Wong et al.
2017/0012359 A1* 1/2017 Jung .................... H01Q 21/065
(Continued)

FOREIGN PATENT DOCUMENTS

CN 206619696 U 11/2017
CN 109301460 A 2/2019
(Continued)

OTHER PUBLICATIONS

International Searching Authority. International Search Report and Written Opinion for PCT Application No. PCT/CN2020/080078 and English translation, mailed May 27, 2020, pp. 1-9.
(Continued)

*Primary Examiner* — Seokjin Kim
(74) *Attorney, Agent, or Firm* — Vivacqua Crane, PLLC

(57) ABSTRACT

An antenna system and a terminal device are disclosed. The antenna system may include a dielectric slab (8); a clearance zone (6) on the dielectric slab (8); a low-frequency antenna (1) with a working frequency band of less than 6 GHz arranged in the clearance zone (6); a millimeter-wave array antenna (2) arranged in the clearance zone (6); and a passive grid structure (7) arranged between the low-frequency antenna (1) and the millimeter-wave array antenna (2).

12 Claims, 5 Drawing Sheets

(51) Int. Cl.

| | |
|---|---|
| ***H01Q 1/52*** | (2006.01) |
| ***H01Q 5/50*** | (2015.01) |
| ***H01Q 13/08*** | (2006.01) |

(58) Field of Classification Search

CPC ........ H01Q 5/50; H01Q 5/307; H01Q 13/085; H01Q 15/0013; H01Q 21/28

See application file for complete search history.

(56) References Cited

U.S. PATENT DOCUMENTS

| | | | | |
|---|---|---|---|---|
| 2017/0141465 | A1* | 5/2017 | Sharawi | H01Q 1/521 |
| 2017/0346179 | A1* | 11/2017 | Wu | H01Q 25/001 |
| 2018/0269577 | A1* | 9/2018 | Kosaka | H01Q 5/48 |
| 2019/0020121 | A1* | 1/2019 | Paulotto | H01Q 21/28 |
| 2019/0089053 | A1* | 3/2019 | Yong | H01Q 1/243 |
| 2019/0109387 | A1* | 4/2019 | Samadi Taheri | H01Q 9/42 |
| 2020/0021009 | A1* | 1/2020 | Huang | H01Q 9/42 |
| 2020/0059009 | A1* | 2/2020 | Sonoda | H01Q 1/523 |
| 2021/0384645 | A1* | 12/2021 | Jia | H01Q 1/243 |
| 2022/0006204 | A1* | 1/2022 | Zhao | H01Q 9/0414 |
| 2022/0123470 | A1* | 4/2022 | Kim | H01Q 1/523 |

FOREIGN PATENT DOCUMENTS

| | | | |
|---|---|---|---|
| CN | 109301474 | A | 2/2019 |
| CN | 208570921 | U | 3/2019 |
| EP | 2028716 | B1 | 4/2017 |

OTHER PUBLICATIONS

European Patent Office. Extended European Search Report for EP Application No. 20809734.5, mailed Feb. 1, 2018, 2022, pp. 1-7.

* cited by examiner

ANTENNA SYSTEM AND TERMINAL DEVICE

CROSS-REFERENCE TO RELATED APPLICATION

This application is a national stage filing under 35 U.S.C. § 371 of international application number PCT/CN2020/080078, filed Mar. 18, 2020, which claims priority to Chinese patent application No. 201910419841.9, filed on May 20, 2019. The contents of these applications are incorporated herein by reference in their entirety.

TECHNICAL FIELD

The present disclosure relates to but is not limited to an antenna system and a terminal device.

BACKGROUND

On Jun. 14, 2018, the 3rd Generation Partnership Project (3GPP) plenary meeting (TSG #80) approved a functional freeze of the fifth-generation mobile communication standard (5G NR) standalone (SA). The first stage of the full-function standardization process for 5G has been completed and the industry has entered a new stage of a full-scale sprint. Major operators are also actively deploying 5G equipment. From the perspective of network architectures, key technologies and basic hardware, the following three aspects of 5G-oriented transformation and construction preparation on 4G network architectures, preceding application of 5G technologies to 4G networks for performance enhancement, and 4G hardware being ready to support smooth evolution to 5G have made "5G based on 4G networks" an optimal low-cost mode of evolution from 4G to 5G networks. Technological changes drive the digital transformation of services. With the "preceding application" of 5G technologies to 4G networks, spectrum resources can be released, which will help the deployment of 5G spectrum strategies and promote the smooth evolution of future services to 5G.

Undoubtedly, 5G will bring brand-new experience to users. It has a transmission rate ten times faster than 4G, which imposes new requirements on antenna systems. In 5G communication, the key to achieve a high rate is the millimeter-wave and beam-forming technology, but traditional antennas obviously cannot meet this requirement, so a millimeter-wave array antenna will be a mainstream antenna scheme in 5G communication. "5G based on 4G networks" is a natural evolution of existing 4G networks and a necessary transition to 5G, and it is also the optimal low-cost mode of evolution from 4G to 5G. By introducing new technologies for 5G into 4G networks in advance and realizing 5G based on 4G networks, it is possible to continuously improve the network capacity and user experience, incubate new business models for 5G by trying new services, and transform existing networks into cloud-based network architecture, so as to maximize the return on investments in 4G networks and build competitiveness in advance for the future.

The network deployment decides that terminal device products need to support both 4G and 5G communications during the transition period, which means that both a low-frequency antenna (2G/3G/4G antenna or sub-6G antenna, working below 6 GHz) and a 5G millimeter-wave array antenna should be considered in one and the same terminal device product.

A common scheme is the 5G array antenna and the low-frequency antenna (2G/3G/4G antenna or sub-6G antenna, working below 6 GHz) being arranged in different clearance zones of the terminal device product, which requires more clearance zones, and this is not conducive to the development of terminal device miniaturization.

SUMMARY

The following is a summary of the subject matter described in detail herein. This summary is not intended to limit the scope of protection of the claims.

Embodiments of the present disclosure provide an antenna system and a terminal device, which realize both a low-frequency antenna and a 5G millimeter-wave end-fire array antenna in a same clearance zone.

An embodiment of the present disclosure provides an antenna system, which may include a low-frequency antenna and a millimeter-wave array antenna, where the low-frequency antenna is an antenna with a working frequency band of less than 6 GHz; the low-frequency antenna and the millimeter-wave array antenna are arranged in one and the same clearance zone on a dielectric slab; and a passive grid structure is arranged between the low-frequency antenna and the millimeter-wave array antenna.

An embodiment of the present disclosure also provides a terminal device, which may include the antenna system.

Other aspects will become apparent after reading and understanding the accompanying drawings and detailed description.

1: low-frequency antenna (i.e. a traditional 2G/3G/4G antenna or sub-6G antenna with a working frequency band of less than 6 GHz);
2: 5G millimeter-wave array antenna;
3: feeding point;
4: grounding point;
5: via hole;
6: clearance zone;
7: passive grid structure; and
8: dielectric slab.

DETAILED DESCRIPTION

Embodiments of the present disclosure will be described hereinafter in detail with reference to the accompanying drawings.

The steps shown in the flowcharts of the drawings may be performed in a computer system, such as with a set of computer-executable instructions. Moreover, although a logical order is shown in the flowcharts, the steps shown or described may be performed, in some cases, in a different order than shown or described herein.

Figure 1:
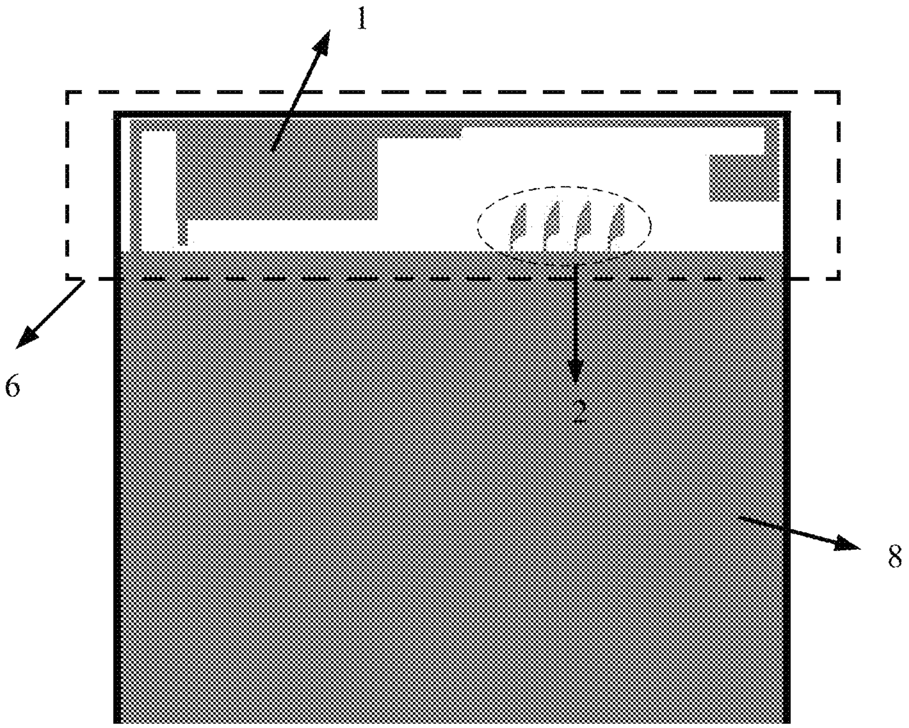
FIG. 1 is a schematic diagram of a millimeter-wave array antenna placed behind a low-frequency antenna.

As shown in FIG. 1, a clearance zone 6 is usually reserved at the bottom or top of a terminal device product as an antenna area. In view of network requirements for non-standalone networking during a transition period from 4G to 5G networks, it is usually required that the terminal device product can not only support 5G networks but also be backward compatible, that is, one terminal device needs to include both a low-frequency antenna 1 (2G/3G/4G antenna or sub-6G antenna working within a frequency band below 6 GHz) and a 5G millimeter-wave array antenna 2.

If the low-frequency antenna (i.e. the traditional 2G/3G/4G antenna or sub-6G antenna with a working frequency band of less than 6 GHz) and the high-frequency antenna (the 5G millimeter-wave array antenna) are intended to be implemented in one and the same clearance zone, there will be the following layout problems.

1. Due to the miniaturization development of terminal device products and the low-frequency coverage of 2G/3G/4G frequency band spanning from 600 MHz, the routing is long and the size of a parallel arrangement is limited.

Figure 2:
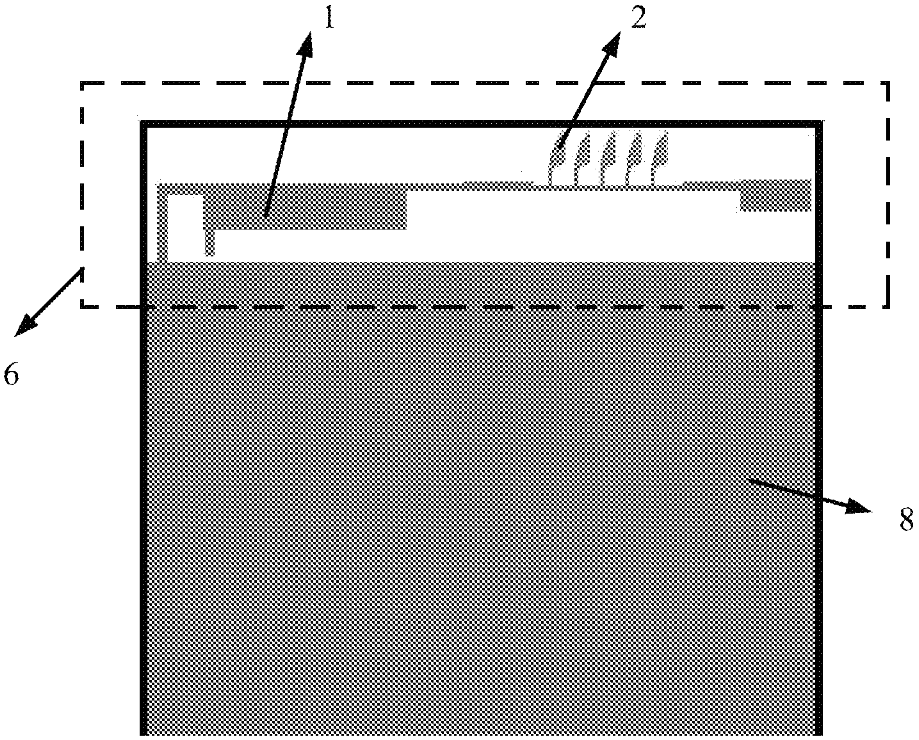
FIG. 2 is a schematic diagram of a millimeter-wave array antenna placed in front of a low-frequency antenna.

2. If the millimeter-wave array antenna 2 is placed in front of the low-frequency antenna 1 (i.e. the traditional 2G/3G/4G antenna or sub-6G antenna with the working frequency band of less than 6 GHz), that is, placed in an electromagnetic wave propagation direction, as shown in FIG. 2, the millimeter-wave array antenna 2 will affect the impedance, the bandwidth, and other performances of the low-frequency antenna 1 (i.e. the traditional 2G/3G/4G antenna or sub-6G antenna, with the working frequency band of less than 6 GHz) due to space constraints; furthermore, a feeding system of millimeter-wave antenna 2 will cross with the low-frequency antenna 1 (i.e. the traditional 2G/3G/4G antenna or sub-6G antenna, with the working frequency band of less than 6 GHz) to cause strong coupling.

3. If the millimeter-wave array antenna 2 is placed behind the low-frequency antenna 1 (i.e. the traditional 2G/3G/4G antenna or sub-6G antenna with a working frequency band of less than 6 GHz), that is, placed in an opposite direction of electromagnetic wave propagation, as shown in FIG. 1, the low-frequency antenna 1 (i.e. the traditional 2G/3G/4G antenna or sub-6G antenna with a working frequency band of less than 6 GHz) will affect the end-fire pattern of the 5G millimeter-wave array antenna 2 due to its low-frequency band and long routing. Therefore, it is a challenging task to realize the coexistence of two generations of antennas in one and the same clearance zone without affecting the working performances of the two generations of antennas.

Figure 3:
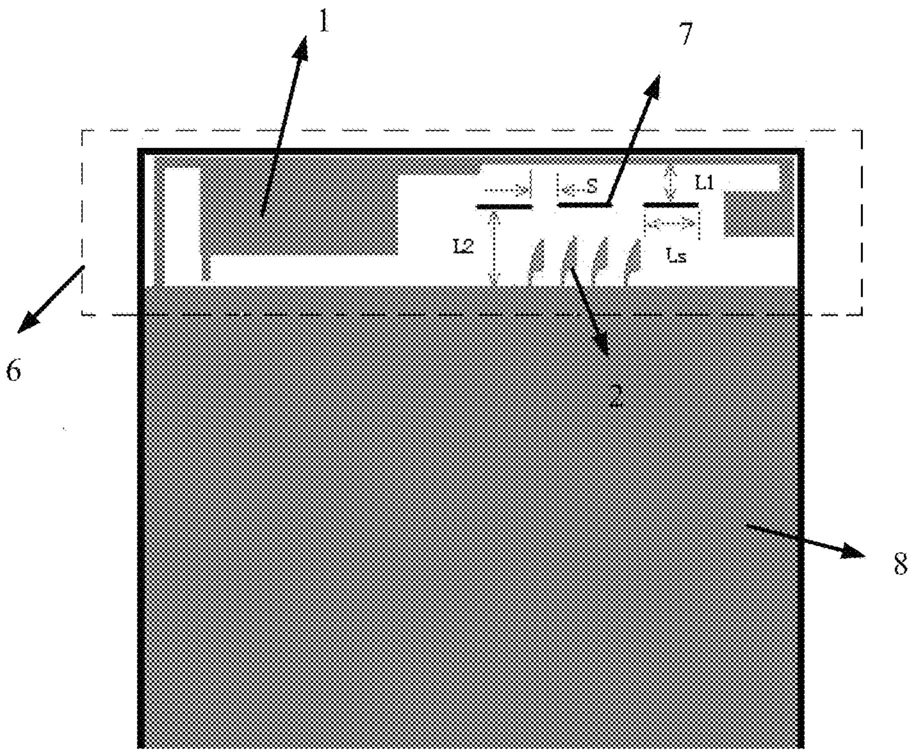
FIG. 3 is a schematic diagram of an antenna system according to an embodiment of the present disclosure.

As shown in FIG. 3, in an embodiment of the present disclosure, the low-frequency antenna 1 and the millimeter-wave array antenna 2 are arranged in one and the same clearance zone 6 on a dielectric slab 8, and a passive grid structure 7 is arranged between the low-frequency antenna 1 and the millimeter-wave array antenna 2.

In this layout, when waves of the millimeter-wave array antenna 2 radiate in an end-fire direction, since the passive grid structure 7 acts as an anti-reflection layer, a part of the waves are transmitted in the end-fire direction and the other part are reflected back to the millimeter-wave array antenna 2 by the passive grid structure 7. The waves transmitted in the end-fire direction will be reflected back to the millimeter-wave array antenna 2 again by the low-frequency antenna 1 (i.e. the traditional 2G/3G/4G antenna or sub-6G antenna with a working frequency band of less than 6 GHz). In this way, there are two parts of waves being reflected to the millimeter-wave array antenna 2, and the two parts of reflected waves arriving at the millimeter-wave array antenna 2 cancel each other out, so that it is possible to realize the technical effect that the millimeter-wave array antenna 2 radiates in the end-fire direction without interference.

In an embodiment of the present disclosure, the low-frequency antenna 1 is arranged in an end-fire direction of the millimeter-wave array antenna 2, that is, in the electromagnetic wave propagation direction.

Since the two reflected waves have opposite phases, which means that a difference between propagation paths to the millimeter-wave array antenna 2 of the two reflected waves is an odd multiple of half wavelength, i.e.:

$$2*(L2+L1)-2*L2=2L1 \tag{1}$$

$$2L1=(2n+1)\lambda/2 \tag{2}$$

where L1 is a distance between the passive grid structure 7 and the low-frequency antenna 1, L2 is a distance between the passive grid structure 7 and an upper substrate of the dielectric slab 8, and n is a natural number. In a practical application, on one hand, due to the spacing between the low-frequency antenna and the millimeter-wave array antenna, the value of L2 cannot be 0; on the other hand, because the low-frequency antenna and the millimeter-wave array antenna are located in the same clearance zone, the value of L2 also cannot be infinite. Therefore, the value of L2 can be determined according to an actual layout need of the low-frequency antenna and the millimeter-wave array antenna in the clearance zone.

In order to make the two reflected waves cancel each other out, L1 is close to a quarter wavelength, and because the working frequency band of the millimeter array antenna 2 is relatively high, even if it has a relatively high absolute bandwidth, its relative bandwidth is relatively low in a case of high-frequency working frequency band, so in the working frequency band of the relative bandwidth, the difference between the two reflected waves is close to 180 degrees. Therefore, the millimeter array antenna 2 can radiate in the end-fire direction without interference.

In an embodiment of the present disclosure, an anti-reflection passive grid structure 7 is designed to be located between two antennas by using the principle of anti-phase cancellation of electromagnetic waves. By adjusting parameters of this structure, the reflected waves are reversed in phase and then cancel each other out, so that the coexistence of the traditional low-frequency antenna 1 (i.e., the traditional 2G/3G/4G antenna or sub-6G antenna with a working frequency band of less than 6 GHz) and the 5G millimeter-wave end-fire array antenna 2 is realized in one and the same clearance zone 6.

Figure 4:
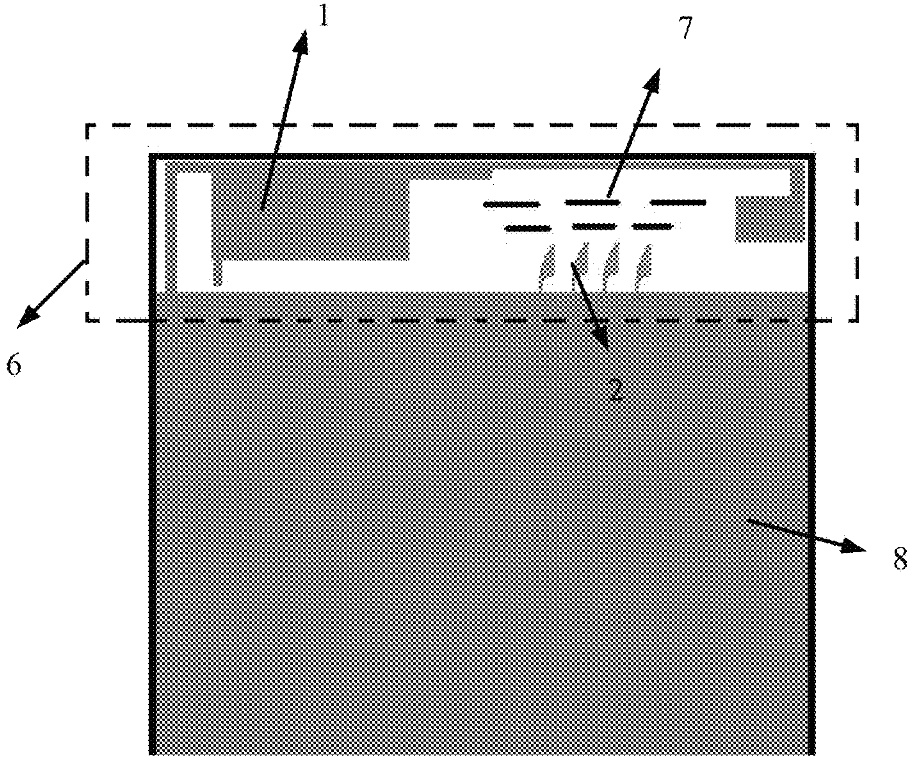
FIG. 4 is a schematic diagram of an antenna system according to another embodiment of the present disclosure.

In an embodiment of the present disclosure, the passive grid structure 7 may be a one-layer or multi-layer structure. For example, as shown in FIG. 4, in this embodiment, the passive gate structure 7 is a two-layer structure.

In an embodiment of the present disclosure, the passive grid structure 7 may be arranged on one or two sides of the dielectric slab.

That is to say, the passive grid structure 7 may be arranged on one surface of the dielectric slab 8, or both surfaces of the dielectric layer 8 may be provided with a passive grid structure 7.

The passive grid structure 7 may also be arbitrarily combined and arranged on any layer of the printed circuit board.

The low-frequency antenna 1 may be a printed antenna or a supported antenna.

The millimeter-wave array antenna 2 may be a printed antenna or a supported antenna.

The passive grid structure 7 may be a printed structure or a supported structure.

An embodiment of the present disclosure also provides a terminal device, which includes the above antenna system.

An antenna system according to an embodiment of the present disclosure includes a low-frequency antenna and a millimeter-wave array antenna, where the low-frequency antenna is an antenna with a working frequency band of less than 6 GHz; the low-frequency antenna and the millimeter-wave array antenna are arranged in one and the same clearance zone on a dielectric slab; and a passive grid structure is arranged between the low-frequency antenna and the millimeter-wave array antenna. In the embodiments of the present disclosure, by using a passive grid structure, a low-frequency antenna and a 5G millimeter-wave array antenna are realized in one and the same clearance zone, and end-fire characteristic of the array antenna can be ensured, which can effectively downsize the additional layout area caused by the coexistence of several generations of antennas, thus being conducive to the development of terminal device miniaturization.

The following is an implementation example for illustration.

Figure 5A:
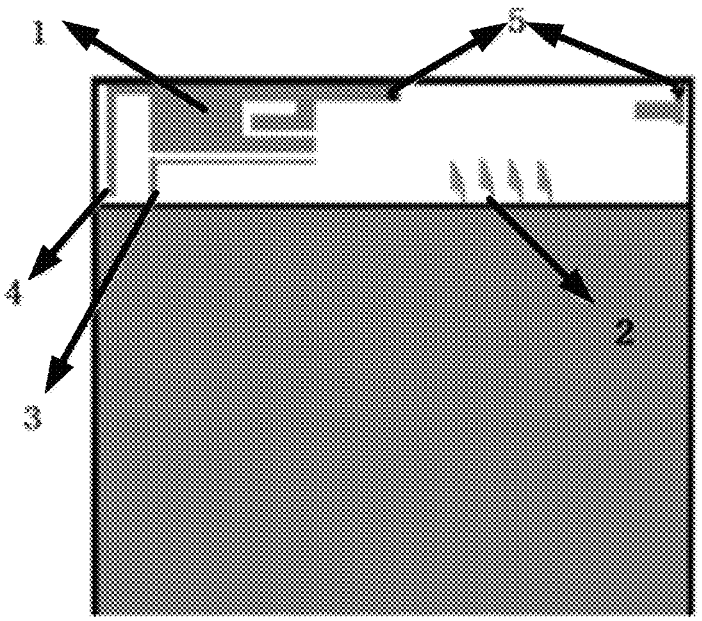
FIGS. 5(*a*) and 5(*b*) are schematic diagrams of an antenna system in an implementation example according to the present disclosure, in which (a) is a front side and (b) is a back side.
Figure 5B:
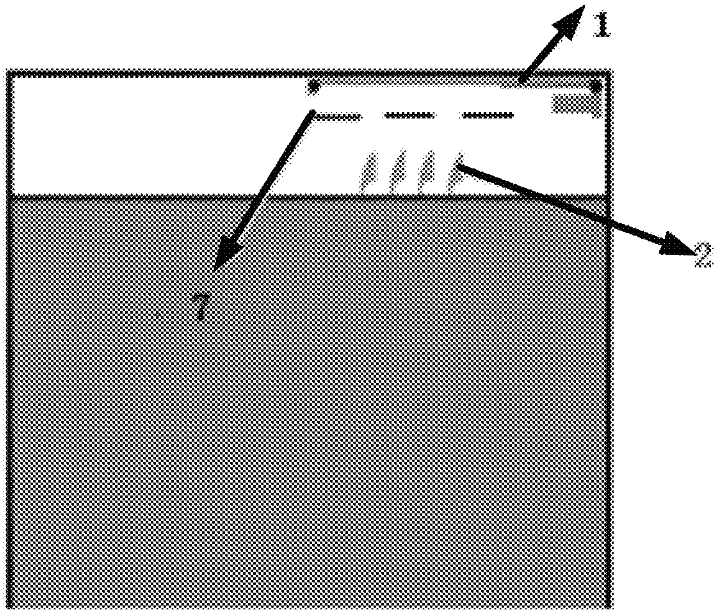

As shown in FIG. 5, there is provided an example of an antenna system that realizes coexistence of a low-frequency antenna (i.e. traditional 2G/3G/4G antenna or sub-6G antenna with a working frequency band of less than 6 GHz) and a 5G millimeter-wave array antenna in one and the same clearance zone. Two generations of antenna systems are both in the form of a printed antenna, the antenna systems are placed on a dielectric slab with a dielectric constant of 2.2 and a thickness of 0.8 mm, and the antenna systems are located at the top of the same clearance zone.

The low-frequency antenna 1 is placed in an end-fire direction of the 5G millimeter-wave array antenna 2. The 5G millimeter-wave array antenna 2 is in the form of a vivaldi antenna (i.e., a tapered slot antenna), two parts of the vivaldi antenna are placed on front and back sides of the dielectric slab, respectively, and parameters of the vivaldi antenna and the spacing between the antennas are adjusted, such that the 5G millimeter-wave array antenna is an end-fire array with a working frequency band of 28 GHz.

Figure 6A:
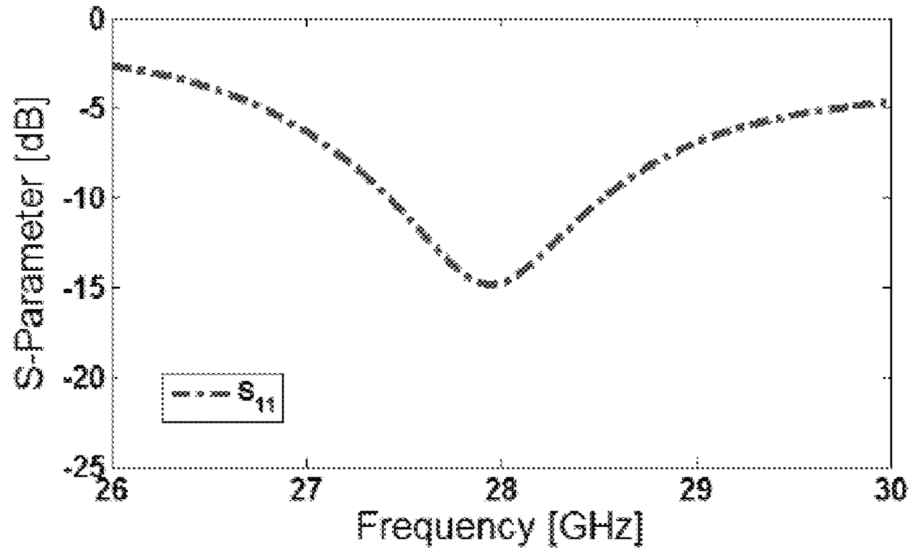
FIGS. 6(*a*) and 6(*b*) are diagrams of simulation results according to an implementation example of the present disclosure.
Figure 6B:
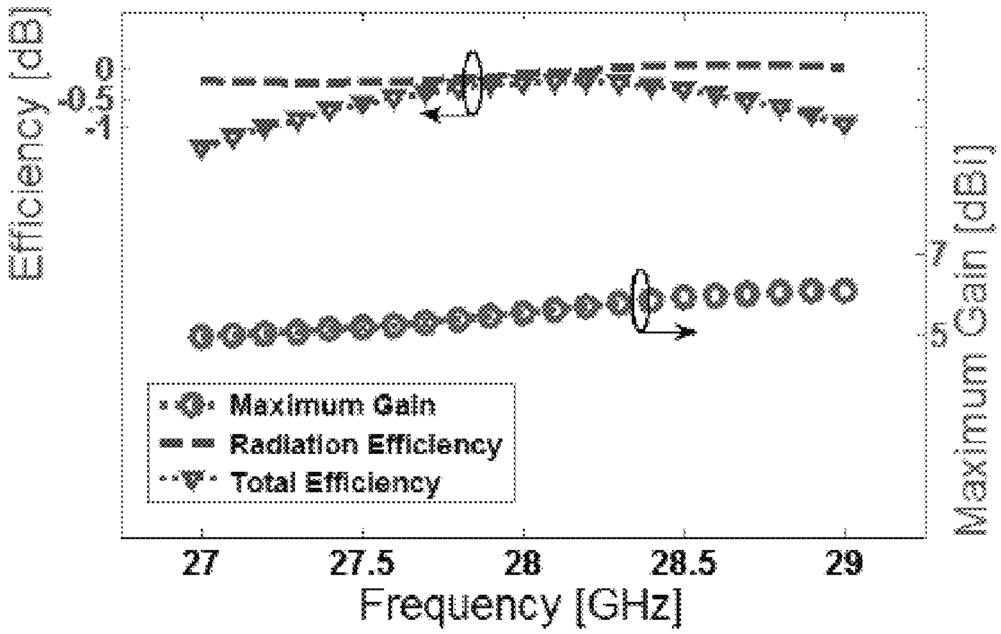

As shown in FIGS. 6(*a*) and 6(*b*), simulation results show that the maximum mutual coupling between the antennas is less than −15 dB, and the antenna efficiency is greater than 60% and the maximum gain is 6 dBi in the working frequency band. The simulation results show that the antenna array still has a high radiation efficiency and gain over a scanning range of angle of +/−70 degrees.

Figure 7:
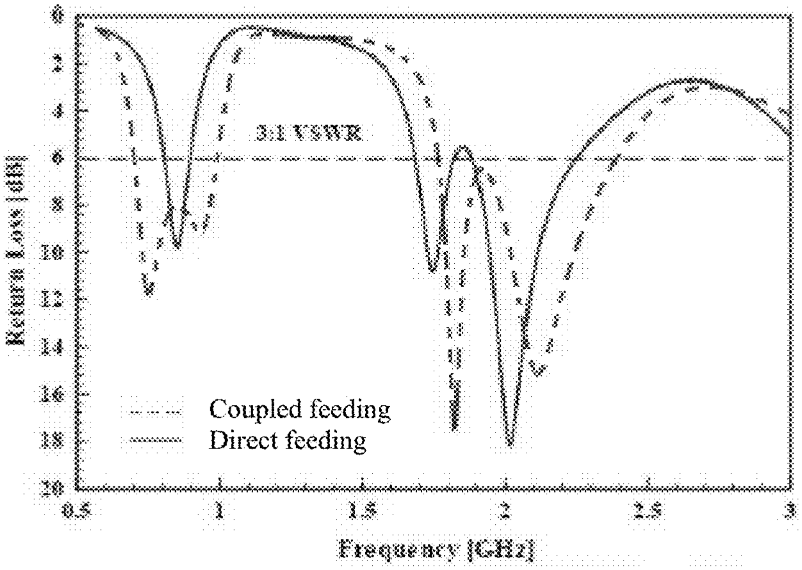
FIG. 7 is a schematic diagram of a working frequency band of a low-frequency antenna according to an implementation example of the present disclosure.

The low-frequency antenna 1 (i.e. the traditional 2G/3G/4G antenna or sub-6G antenna with a working frequency band of less than 6 GHz) is in the form of a printed antenna, where one part of the antenna is on the front side of the dielectric slab, as shown in FIG. 5(*a*), and the other part of the low-frequency antenna 1 is routed to the back side of the dielectric slab through via holes 5, where 4 is a grounding point and 3 is a feeding point for coupled feeding. In simulation, it is found that the coupled feeding can effectively expand the low-frequency bandwidth compared with direct feeding, and the working frequency band of the antenna ranges from 698 MHz to 960 MHz and from 1700 MHz to 2300 MHz, as shown in FIG. 7.

In this implementation example, the passive grid structure 7 is located on the back side of the dielectric slab. Parameters (mutual spacings, size, and distance from the antenna) of the grid structure are adjusted such that the spacing parameters (L1 and L2) satisfy the formulas (1) and (2), and then the width Ls and the spacing S of the grid structure are adjusted according to radiation characteristics of the array antenna, to make sure that the array still has the end-fire characteristic when the two antennas work simultaneously. Experimental simulation results show that adding of a passive grid structure enables the low-frequency antenna 1 and the 5G millimeter-wave array antenna 2 to be simultaneously realized in the same clearance zone without affecting the end-fire characteristic of the array antenna.

Figure 8:
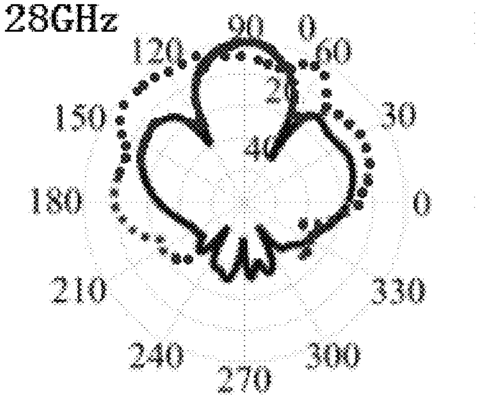
FIG. 8 is a schematic diagram of simulation according to an implementation example of the present disclosure, in which the solid line is an end-fire pattern of only a 5G millimeter-wave array antenna, and the dashed line is an end-fire pattern when a 5G millimeter-wave array antenna coexists with a low-frequency antenna and without a grid structure provided.
Figure 9:
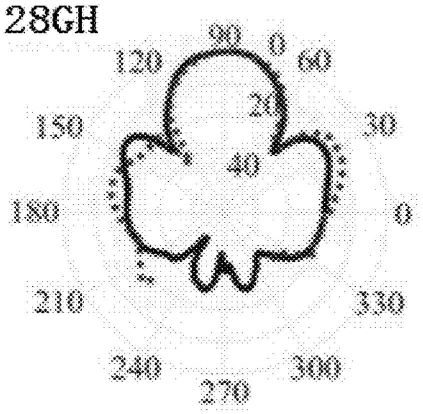
FIG. 9 is a schematic diagram of simulation according to an implementation example of the present disclosure, in which the solid line is an end-fire pattern of only a 5G millimeter-wave array antenna, and the dashed line is an end-fire pattern when a 5G millimeter-wave array antenna coexists with a low-frequency antenna and with a grid structure provided.

The simulation results are shown in FIGS. 8 and 9. As shown in FIG. 8, when the scheme according to the embodiments of the present disclosure is not adopted, the end-fire characteristics of the 5G millimeter-wave array antenna 2 are affected by the low-frequency antenna 1. As shown in FIG. 9, when the scheme according to the embodiments of the present disclosure is adopted, the 5G millimeter-wave array antenna 2 still has the end-fire characteristics.

It should be noted that the low-frequency antenna 1 in the embodiments of the present disclosure is an antenna with a working frequency band of less than 6 GHz, and is not limited to all antennas working in 2G/3G/4G frequency bands, including WLAN (Wireless Local Area Network), sub-6G and other antennas working below 6 GHz.

The 5G millimeter-wave array antenna 2 according to the embodiments of the present disclosure can work in all millimeter-wave frequency bands, not limited to working at 28 GHz.

The low-frequency antenna 1 and the millimeter-wave array antenna 2 may be a printed antenna or, alternatively, a supported antenna and the like. In summary, the embodiments of the present disclosure use the principle of anti-phase cancellation of electromagnetic waves to realize the coexistence of a 4G antenna (including 2G/3G antenna working below 6 GHz frequency band) and a 5G millimeter-wave array antenna in one and the same clearance zone. That is, an anti-reflection passive grid structure is designed to be placed between the low-frequency antenna (including 2G/3G/4G antenna and sub-6G antenna working below 6 GHz frequency band) and the 5G millimeter-wave array antenna. By adjusting the structure, reflected waves can have opposite phases and then cancel each other out, so that the low-frequency antenna and the 5G millimeter-wave end-fire array antenna can be simultaneously realized in the same clearance zone, and the end-fire characteristics of the 5G millimeter-wave end-fire array antenna can be guaranteed, which can effectively downsize the additional layout area caused by the coexistence of several generations of antennas, thus being conducive to the development of terminal device miniaturization.

The invention claimed is:

1. An antenna system, comprising:
- a dielectric slab;
- a clearance zone on one end of the dielectric slab;
- a low-frequency antenna with a working frequency band of less than 6 GHz arranged in the clearance zone;
- a millimeter-wave array antenna arranged in the clearance zone; and
- a multi-layer passive grid structure arranged between the low-frequency antenna and the millimeter-wave array antenna on both sides of the dielectric slab.

2. The antenna system of claim 1, wherein the low-frequency antenna is arranged in an end-fire direction of the millimeter-wave array antenna.

3. The antenna system of claim 1, wherein a distance L1 between the multi-layer passive grid structure and the low-frequency antenna is related to a signal wavelength λ of the millimeter-wave array antenna as $2L1=(2n+1)\lambda/2$, where n is a natural number.

4. The antenna system of claim 1, wherein the low-frequency antenna is a printed antenna or a supported antenna.

5. The antenna system of claim 1, wherein the millimeter-wave array antenna is a printed antenna or a supported antenna.

6. The antenna system of claim 1, wherein the passive grid structure is a printed structure or a supported structure.

7. A terminal device comprising an antenna system comprising:
- a dielectric slab;
- a clearance zone on one end of the dielectric slab;
- a low-frequency antenna with a working frequency band of less than 6 GHz arranged in the clearance zone;
- a millimeter-wave array antenna arranged in the clearance zone; and
- a multi-layer passive grid structure arranged between the low-frequency antenna and the millimeter-wave array antenna on both sides of the dielectric slab.

8. The terminal device of claim 7, wherein the low-frequency antenna is arranged in an end-fire direction of the millimeter-wave array antenna.

9. The terminal device of claim 7, wherein a distance L1 between the multi-layer passive grid structure (7) and the low-frequency antenna (1) is related to a signal wavelength λ of the millimeter-wave array antenna (2) as $2L1=(2n+1)\lambda/2$, where n is a natural number.

10. The terminal device of claim 7, wherein the low-frequency antenna (1) is a printed antenna or a supported antenna.

11. The terminal device of claim 7, wherein the millimeter-wave array antenna is a printed antenna or a supported antenna.

12. The terminal device of claim 7, wherein the multi-layer passive grid structure is a printed structure or a supported structure.

* * * * *